Feb. 19, 1929.
H. O. PRESTON
SOLDER WIPING MACHINE
Filed June 22, 1925

H. O. PRESTON 1,702,745

SOLDER WIPING MACHINE

Filed June 22, 1925

Inventor
Harrison O. Preston
By his Attorney
R. J. Dearborn

Patented Feb. 19, 1929.

1,702,745

UNITED STATES PATENT OFFICE.

HARRISON O. PRESTON, OF PORT ARTHUR, TEXAS, ASSIGNOR, BY MESNE ASSIGNMENTS, TO THE TEXAS COMPANY, OF NEW YORK, N. Y., A CORPORATION OF DELAWARE.

SOLDER-WIPING MACHINE.

Application filed June 22, 1925. Serial No. 38,604.

This invention relates to the manufacture of metal cans and containers and has special reference to the removal of excess solder and the formation of a smooth surface along the soldered seams of the cans and containers during their formation.

The invention pertains to an apparatus or machine for manufacturing metal containers in which it is required to solder one or more seams of a series of containers as they are conducted by conveyors, the various seams to be soldered being successively passed through solder baths. After each application of solder has been made the cans or containers are subjected to the action of a new and improved mechanism or apparatus by which the excess solder is removed and an even surface is made over the soldered seam.

According to my invention I apply suitable buffs or wipers rotating in different planes across the soldered seam in order to insure that no ridges of solder remain on the containers and in order that every portion of the seams may be thoroughly brushed and a maximum amount of excess solder recovered.

One object of my invention is to provide a simple and improved mechanism which is so constructed and arranged that the entire width of several buffs comes in contact with the edge of the can, thus effectively removing the excess solder and enabling the buffs to be worn down evenly without any formation of ribs or grooves in the wiping surface. This object is accomplished by arranging the buffs at a proper angle with respect to the edge of the can, the relative positions of the buff and the edge of the can being wiped being such that the edge of the can makes an acute angle with the buff.

Another object of my invention is to provide for the wear of the buffs and to adjust them so that they exert a substantially constant pressure on the seams being wiped.

Other objects, features and advantages of my invention will appear from the following description thereof.

In the drawings which illustrate the preferred form of the invention:

Figure 1:
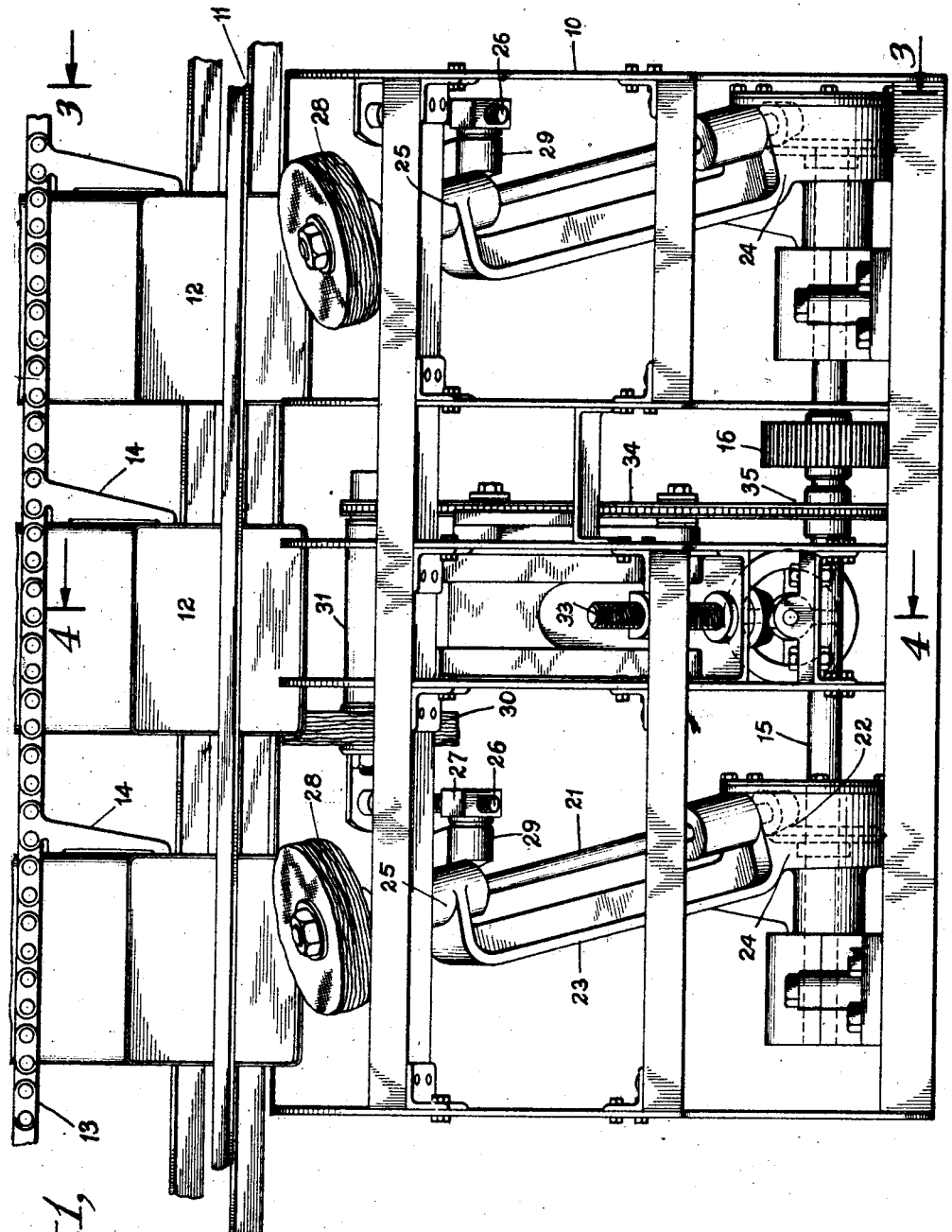
Fig. 1 is a view in side elevation of an apparatus constructed in accordance with my invention and constituting an embodiment thereof.
Figure 2:
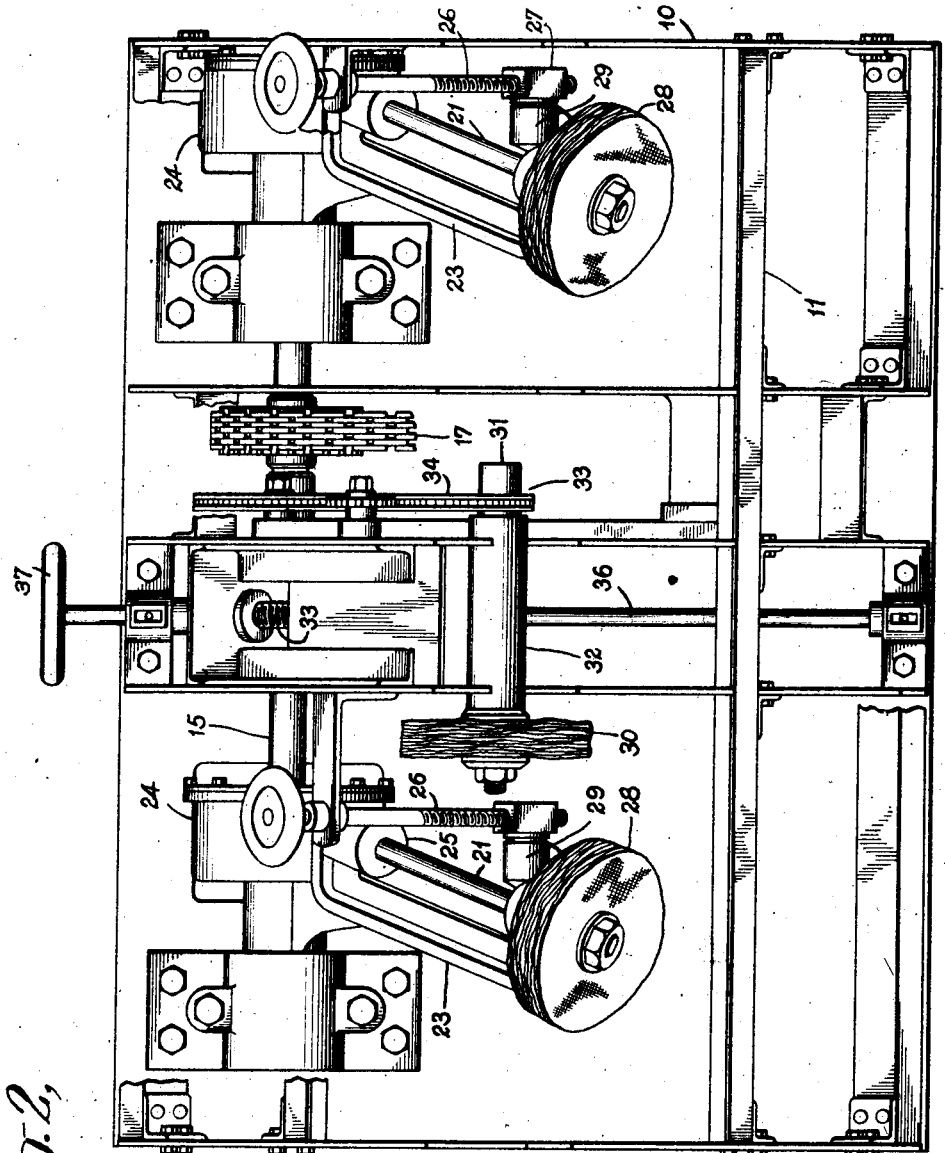
Fig. 2 is a plan view of the apparatus illustrated in Fig. 1.
Figure 3:
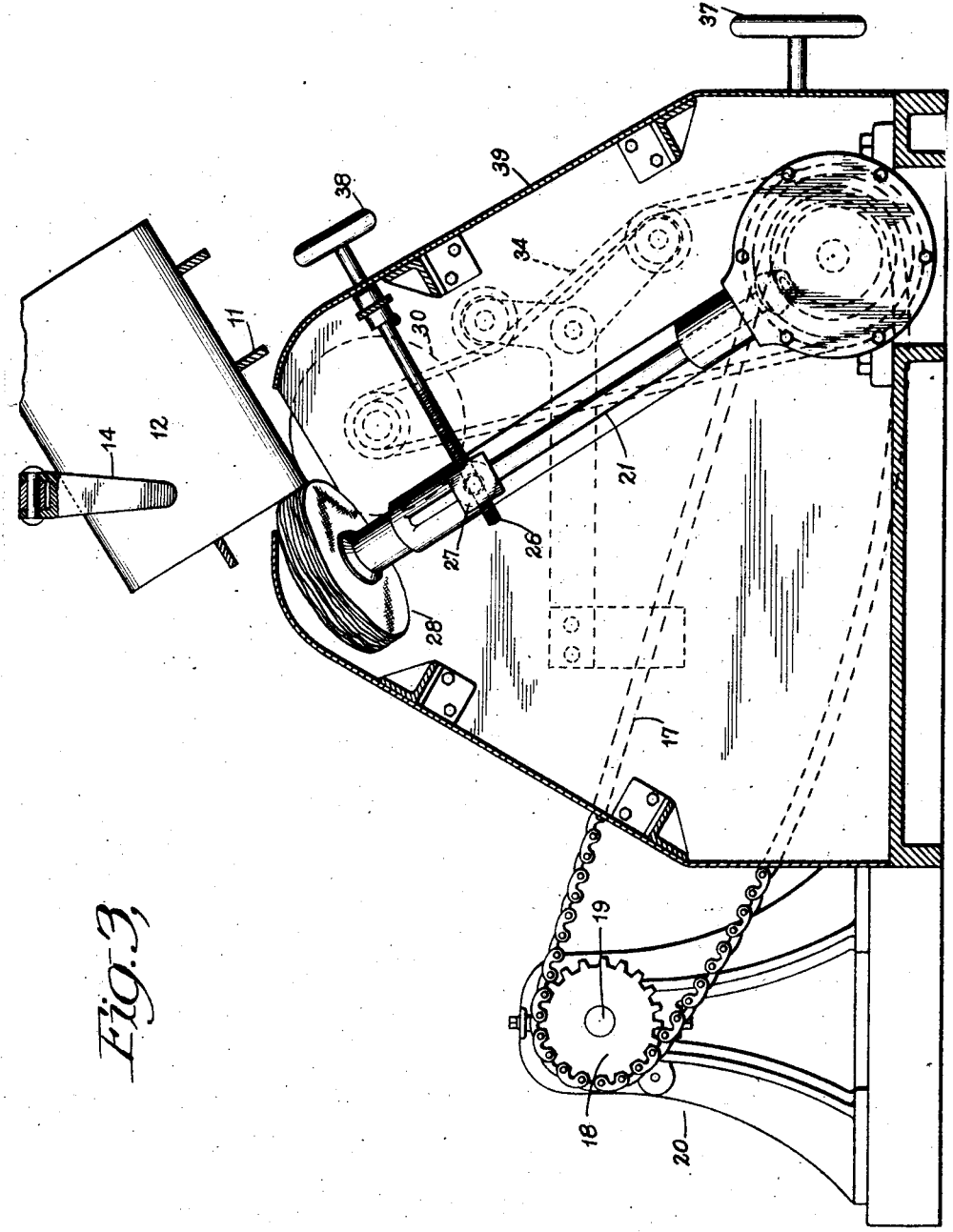
Fig. 3 is a sectional view taken on the line 3—3 of Fig. 1.
Figure 4:
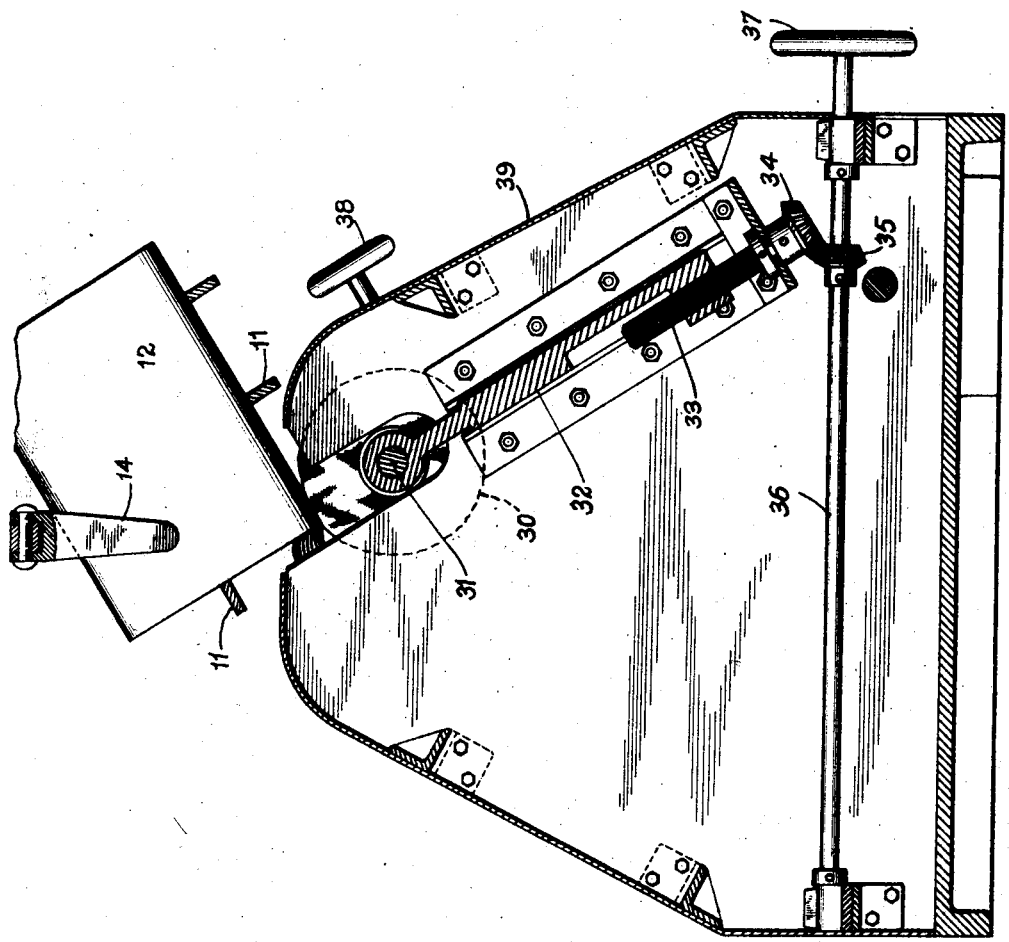
Fig. 4 is a sectional view taken on the line 4—4 of Fig. 1.

Referring to the drawings, 10 represents a framework provided with a horizontally disposed track 11 upon which a succession of square cans or containers 12 are moved at regulated intervals by means of a travelling conveyor 13 having lugs 14 adapted to engage one side of each can. While a single solder wiping machine is shown for purposes of illustration it is to be understood that a number of machines may be used together and a single track provided for carying the cans past the wipers or buffs of the several machines. In such event the track is cammed at regular intervals so that the cans will be turned to expose different edges or seams to the action of the buffs of the different machines.

A driving shaft 15 is journaled in the framework 10 and mounted thereon is a gear wheel 16 which carries one end of a link chain 17. The opposite end of the chain 17 is carried on a gear wheel 18 mounted on a shaft 19 of a motor 20, the motor being driven by suitable means (not shown) and providing the motive force for operating the driving shaft 15.

A plurality of substantially vertically disposed rotatable shafts 21 are geared at one end to the driving shaft 15 as at 22, each of the shafts being supported in a bracket 23 formed integral with spaced housings 24 on the shaft 15 within which the gears connecting the shafts 21 and the driving shaft 15 are positioned. By thus enclosing the gears in the housings 24 the matter of lubricating them is simplified as the lubricant can readily be placed directly in the housings. Each bracket 23 is thus in effect pivoted upon the driving shaft 15 and each is formed with suitable bearing blocks 25 for the shafts 21. Adjusting screws 26 which work in nuts 27 are provided for adjusting the shafts 21. The screws 26 are provided with suitable hand wheels 38. A suitable wiper or buff 28 is mounted on the upper end of each shaft 21, the shafts being mounted and maintained at such an angle that the buffs 28 carried thereby form an acute angle with respect to the edge of the cans with which they are adapted to contact. As illustrated, a block 29 is formed integral with each of the upper bearing blocks 25 and the block 29 is screw-connected to the nut 27. Thus the position of the shafts 21 can be readily varied without in any way interfering with the operation of the machine.

In addition to the buffs 28 mounted on the shafts 21 there is provided at least one other buff, such as 30, which is positioned in a plane at substantially right angles to the edge of the can to be wiped. The buff 30 is mounted on a shaft 31 which is suitably journalled in a bracket or block 32 mounted in the frame of the machine.

The shaft 31 is provided with a gear wheel 33 which carries a link chain 34, the opposite end of which is carried by a gear wheel 35 mounted on the main driving shaft 15. Thus it will be seen that the shafts 21 and 31 are all driven by the common driving shaft 15.

The bracket or block 32 is mounted in the frame of the machine in such a way as to provide for a necessary amount of longitudinal movement. An adjusting screw 33 works in the bracket or block 32 and on one end of the screw there is mounted a bevel gear 34 which meshes with another bevel gear 35 positioned on a shaft 36 which is mounted in the frame of the machine. One end of the shaft 36 is provided with a hand wheel 37 so that by occasionally turning the hand wheel the buff 30 on the shaft 31 may, although wearing away with use, be kept in wiping contact with the edges of the cans. The entire machine is preferably enclosed within a housing 39, provision of course being made in the top to allow for the contact between the buffs and the cans.

The operation of the apparatus is briefly as follows:

The motor 20 is first started, thereby putting the driving shaft 15 into operation, as well as the shafts 21 and 31 upon which the buffs 28 and 30 are mounted. At the same time the conveyor 13 is started so that while the several buffs are rotating a succession of cans is advanced along the track 11 and an edge of each can, after the necessary solder has been applied, comes in wiping contact with the several buffs so that all excess solder is removed and a smooth seam formed.

As has already been stated, the buffs 28 are arranged as such an angle with respect to the exposed edges of the cans that the entire width of each buff comes in wiping contact with the edges of the cans. The relative positions of the buffs 28 and the edges of the cans being wiped are such that the edge of each can makes an acute angle with each buff 28. An angle of approximately 15° has, in practice, been found to be quite satisfactory. The buff 30, as has already been explained, is positioned at right angles with respect to the edge of the can to be wiped. Thus in passing along the track 11 an edge of each can is subjected to the action of a number of buffs arranged at an acute angle and of at least one buff arranged at right angles with respect to the edge of the can. The combined action of the buffs effects an extremely neat soldered seam.

Apparatus of preferred form and construction has been shown and described for the purpose of showing one way in which this invention may be practiced, but the inventive thought upon which this application is based is broader than this illustrative embodiment thereof. It is, therefore, understood that the scope of the invention is not to be limited by the present disclosure, reference being had to the appended claims for that purpose.

What I claim is:

1. In a solder-wiping machine, the combination with means for moving a plurality of spaced cans with a seam of each can exposed, of a plurality of rotatable buffs adapted to successively engage the exposed seams of said cans, a portion of said buffs being disposed at an acute angle with respect to said exposed seams so that the entire width of each of said buffs comes in contact with the edge of the can and another buff disposed in a plane at right angles thereto.

2. In a solder wiping machine, the combination with means for moving a square can with an end seam of the can exposed, of a rotatable buff disposed at an acute angle with respect to the exposed edge of the can and adapted for wiping engagement therewith, and a rotatable buff disposed at substantially a right angle with respect to said edge and adapted for wiping engagement therewith.

In witness whereof I have hereunto set my hand this 9th day of June, 1925.

HARRISON O. PRESTON.